Patented July 22, 1924.

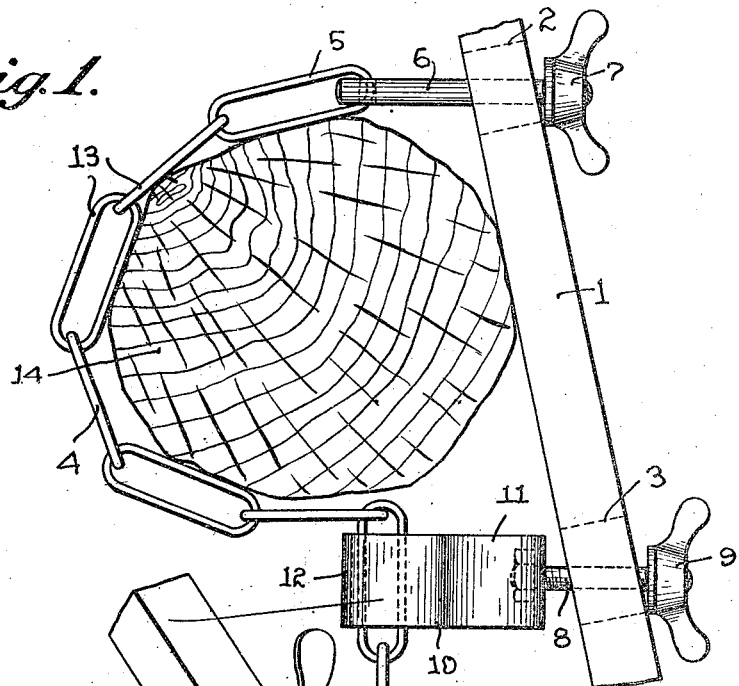
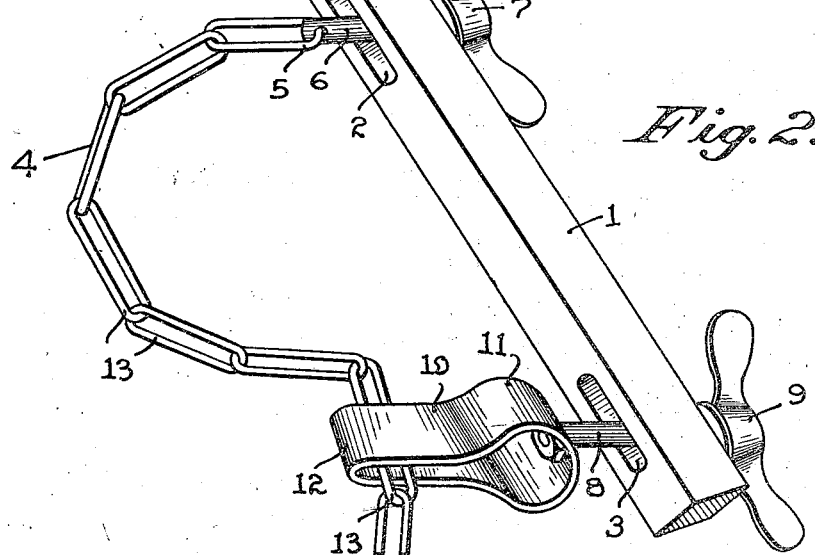

1,502,031

UNITED STATES PATENT OFFICE.

ROBERT E. GRAY, OF SNOQUALMIE FALLS, WASHINGTON.

CROSS ARM.

Application filed December 17, 1923. Serial No. 681,274.

*To all whom it may concern:*

Be it known that ROBERT E. GRAY, citizen of the United States, residing at Snoqualmie Falls, in the county of King and State of Washington, has invented certain new and useful Improvements in Cross Arms, of which the following is a specification.

This invention is directed to a cross arm connector and support, whereby as in the logging industry, the cross arms for supporting the signal and other lines may be readily connected to or disconnected from a tree in a simple expeditious manner.

The invention comprises a cross arm connecting means for quickly and rigidly securing the cross arm in position at the desired height on a tree without the necessity of boring into or through the tree trunk, or particularly forming the cross arm for connection with the particular tree.

The invention is illustrated in the accompanying drawings, in which:

Fig. 1 is a plan view of the connection in use, the tree being shown in section.

Fig. 2 is a perspective view of the cross arm and connector detached.

The improved cross arm 1 which may be of any appropriate or usual form aside from the details hereinafter noted, is formed near its mid-length with narrow elongated slots 2 and 3.

The connector proper comprises a chain 4 having an eye 5 at one end to be connected to a bolt 6 passing through one of the slots as 3 and provided beyond the cross arm with a thumb nut or other tightening means 7, whereby the bolt and consequently the chain may be adjusted relative to the cross arm. A similar bolt 8 having a terminal thumb nut 9 is passed through the remaining slot 2 and loosely provided at the inner end with a locking member in the form of a locking link 10, having an enlarged eye portion 11, which is directly engaged with the bolt 8 and a narrow elongated portion 12 which extends beyond but in open communication with the eye portion 11. The chain 4 is made up of links 13, and the eye portion 11 of the locking member is of such diameter as to permit the ready passage therethrough of the links, while the narrow portion 12 of the locking member is of such width as to permit the movement of a link therein only when said link is arranged edgewise as clearly indicated in Fig. 1.

The locking member is of substantial thickness and width to resist necessary strains, and is connected to the bolt 8 in a manner to permit a swinging or sliding movement of the locking member, as indicated in Fig. 2.

In applying the cross arm 1, the chain is passed about the tree as 14 at the desired height, with the cross arm resting against the surface of the tree. The free end of the chain is drawn through the eye 11 of the locking member and manually tightened, and after tightening, the appropriate link is passed lengthwise into the reduced portion 12 of the locking member. As the adjacent link beyond the link so engaged in the reduced portion is of course at right angles to the engaged link, such adjacent link cannot pass through the reduced portion of the locking member, and hence the chain is held against endwise movement in the locking member. The bolt 8, and if necessary, also the bolt 6, may be then tightened to secure the chain tightly around the tree, thus binding and supporting the cross arm in place.

Ordinarily, cross arms are secured by boring through the cross arm and tree to receive a supporting bolt, after which one or more braces extend from the cross arm to the tree. This involves considerable work and expenditure of time in connecting or disconnecting the cross arm, while with the structure here described, the cross arm may be applied to the tree or disconnected therefrom with very little effort and in an extremely short time. Under those circumstances, where it may be found desirable to brace the cross arm even with the connecting structure here described, the use of a single brace between the cross arm and tree is contemplated, though it is not believed that such will be necessary.

Claims:

1. A means for securing a cross arm to a mast or the like, consisting in forming said cross arm with elongated apertures, providing bolts to be passed loosely through said apertures, a chain member connected to one of said bolts, a relatively broad link connected to the other of said bolts and having an opening therethrough formed in part of a size to freely permit the passage of the chain links therethrough and in part of a size to permit the edgewise passage of the chain links therethrough, and means for drawing the bolts through the cross arm.

2. In combination, a cross arm formed with elongated openings, bolts passed loosely through said openings, adjusting means secured on terminals of the bolts, a chain connected to one of said bolts, and a broad link shaped locking member secured to the other of said bolts, said locking member being formed to present a key hole opening having a width in its narrow part less than the similar dimension of a link of the chain.

3. The combination with a cross arm formed with elongated slots, bolts mounted in the slots and adjustable transverse the cross arm and permitted limited play longitudinally of the cross arm, a chain having one terminal connected to one of said bolts, and a link shaped locking member secured to the terminal of the other of said bolts, said locking member being formed to permit the passage of the chain readily therethrough in one part of said member and to interlock with the chain to prevent movement of the chain therethrough in another part of such member.

In testimony whereof I affix my signature.

ROBERT E. GRAY.